United States Patent [19]
Cutler

[11] 3,946,565
[45] Mar. 30, 1976

[54] INTERCOOLER FAN AND COMPRESSOR CONSTRUCTION

[75] Inventor: John Frederick Cutler, Indianapolis, Ind.

[73] Assignee: Wallace Murray Corporation, New York, N.Y.

[22] Filed: Aug. 29, 1974

[21] Appl. No.: 501,805

[52] U.S. Cl................ 60/599; 123/119 C; 415/178
[51] Int. Cl.² ......................................... F02B 29/04
[58] Field of Search ...... 60/599; 415/143, 178, 180; 123/119 C

[56] References Cited
UNITED STATES PATENTS

| | | | |
|---|---|---|---|
| 2,682,365 | 6/1954 | Pielstick | 415/178 |
| 2,918,787 | 12/1959 | Schelp | 60/599 |
| 3,143,103 | 8/1964 | Zuhn | 60/599 |
| 3,781,126 | 12/1973 | Behisek | 415/178 |

FOREIGN PATENTS OR APPLICATIONS

| | | | |
|---|---|---|---|
| 173,387 | 9/1933 | Switzerland | 415/180 |
| 752,844 | 3/1933 | France | 415/180 |
| 388,991 | 6/1908 | France | 415/180 |
| 499,357 | 7/1938 | United Kingdom | 415/178 |

Primary Examiner—Wendell E. Burns
Assistant Examiner—David D. Reynolds
Attorney, Agent, or Firm—Thomas J. Greer, Jr.

[57] ABSTRACT

A turbocharger for an internal combustion engine. The turbocharger is coupled to an air-to-air heat exchanger (intercooler) to cool the compressed air just prior to its entry into the engine. The turbocharger has axially spaced turbine, compressor, and fan rotors to thereby preclude undesired mixing of air streams.

8 Claims, 3 Drawing Figures

SYSTEM LAYOUT

THREE WHEEL TURBOCHARGER

INTERCOOLER FAN AND COMPRESSOR CONSTRUCTION

This invention relates to a turbocharger compressor having a construction particularly adapted for use with an air-to-air intercooler in an internal combustion engine. Turbocharger of this general type are known and one example, although by no means intended to be exhaustive, is afforded by U.S. Pat. No. 3,781,126, issued to Benisek. Another example is U.S. Pat. No. 3,143,103 to Zuhn. At FIG. 5 of the Benisek patent, an air-to-air intercooler is illustrated in combination with an internal combustion engine and a particular turbocharger. While such systems employing air-to-air intercoolers are, in general, known in the internal combustion art, the use of a particular turbocharger configuration may yield improved performance of the combination.

As illustrated in the Benisek patent, the air intended to function as cooling air for the hot, compressed gas passing from the compressor to the engine is ambient and is accordingly (without the use of refrigeration systems) at the lowest possible temperature to thereby yield the greatest possible cooling action. In spite of the many advantages displayed by the construction disclosed in the Benisek patent, it has been observed that the cooling stream of air which enters the compressor from ambient has been increased somewhat in temperature due to heat exchange relation with the air from the intercooler. The air entering the compressor from ambient has mixed to some degree with the heated air coming from the cooling path of the intercooler. This results in some of the air being already raised in temperature prior to its being compressed by the compressor.

It has further been observed with respect to the construction shown in the noted Benisek patent that the radially outermost portions of the fan rotor travel at relatively high lineal speeds due to the appreciable radius of the tip of the rotor. Due to the nature of the construction of the noted Benisek turbocharger, it is not possible to arbitrarily reduce the radius of the fan or fan rotor which pulls the air through the intercooler from ambient. were, however, such reduction in radius possible, the efficiency of the fan could, in some applications, be improved by virtue of its tip portion operating in a lower lineal speed range to yield greater fan efficiency.

According to the practice of this invention, such problems are overcome by a novel rotor construction for the turbocharger. A three-rotor construction is employed, with the rotors being the conventional turbine rotor, a compressor rotor (with associated input and output chambers) and a fan rotor, or more simply, a fan. The fan, in one embodiment described, is located at one end of the shaft carrying the other two rotors. A seal is provided between the rotor shaft and a portion of the annular housing of the input to the compressor to thereby preclude any mixing of the air streams passing through the cooling path of the intercooler and the ambient air coming into the compressor. In another embodiment, the fan is positioned between the turbine and compressor housings. The exhaust from the fan is directed to the turbine housing, thus cooling it by convection, and reducing the amount of heat transmitted to the compressor section.

Figure 1:
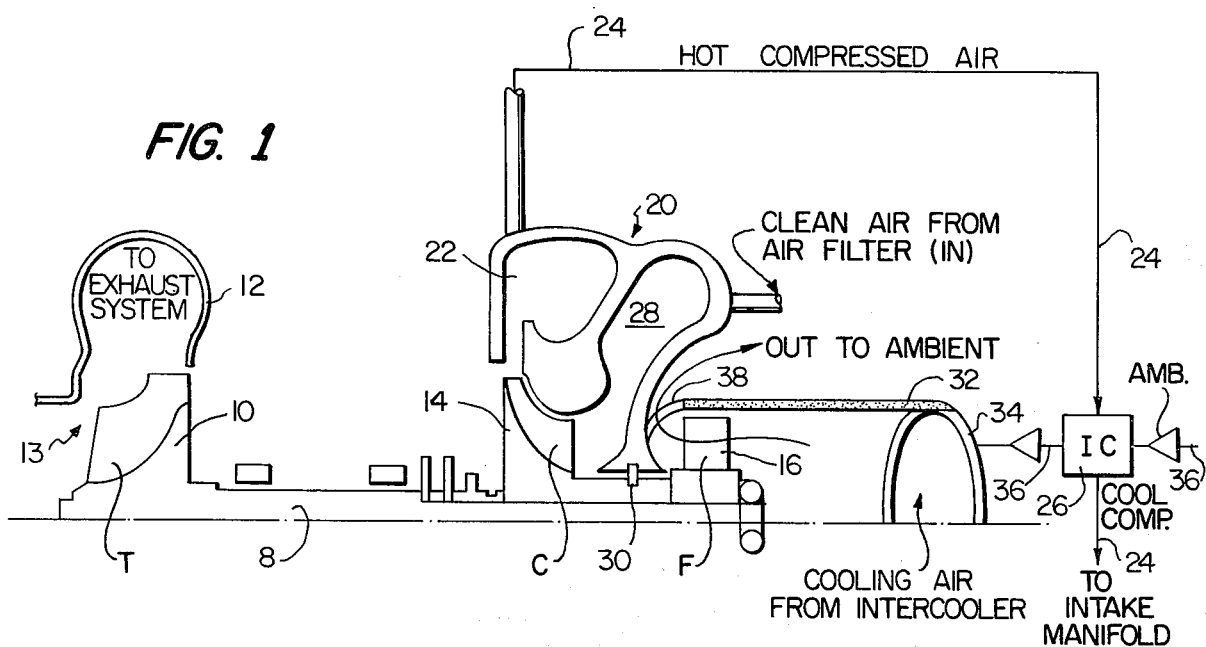
FIG. 1 is a partially schematic cross-sectional view of a three-rotor turbocharger according to the practice of this invention.

Referring now to the drawings, the numeral 8 denotes a shaft carrying three rotors at axially-spaced portions therealong. The first rotor is a turbine motor denoted by the numeral 10 and surrounded by an annular chamber 12 of conventional construction. High temperature and high pressure gases from the exhaust manifold of an internal combustion engine are fed into the intake mouth 13, with the thermal and kinetic energies of these gases being imparted to the shaft 8 by means of rotor 10, all in a manner well known in the art.

The numeral 14 denotes a compressor rotor also carried by shaft 8. A fan rotor 16 is carried at the end of shaft 8. An annular compressor 20 of conventional configuration surrounds compressor rotor 14 and includes an annular output chamber 22 having a hydraulic line 24 coupled to one flow path of air-to-air intercooler 26. The input chamber 28 of the compressor 20 is provided at its radially innermost portion with an annular seal 30 extending around shaft 8.

The numeral 32 denotes a duct whose longitudinal axis is generally coincident with the axis of shaft 8 and whose input end 34 is in closed fluid (hydraulic) communication with second heat exhange path 36 through intercooler 26. The output end 38 of duct 32 opens to ambient and is adjacent one wall of compressor input chamber 28, and it is seen that the end 38 of the duct surrounds the fan 16.

The mode of operation of the turbocharger and system described above is as follows. Exhaust gases from the exhaust manifold of an internal combustion engine 40 (see FIG. 2) enter the mouth or input 13 of the turbine stage which carries turbine rotor 10. The energy of these gases turns the rotor 10, with the now somewhat spent gases going to exhaust, as indicated. A typical environment is that of an automobile or truck and the exhaust system would lead either directly to ambient or to a catalyst bed or some other type of device for detoxification/cleaning treatment prior to final discharge to the atmosphere. The rotary energy is now employed, so to speak, by turbine wheel 14 to compress ambient air passing into input chamber 28 through a conventional air cleaner or air filter. The input to the air cleaner is, in turn, connected to ambient. The compressor output passes to annular chamber 22 and thence to duct 24 for passage through intercooler 26. Intercooler 26 lowers the temperature of this compressed air and it now passes into the intake manifold of internal combustion engine 40.

Fan 16 causes a partial vacuum in duct 32 with the result that ambient air is drawn in line 36 into the input end of one of the two hydraulic paths of heat exchanger or intercooler 26. This ambient air is thus placed in heat exchange relation or contact with the hot, high pressure air from compressor 20, and the somewhat warmed-up ambient now passes through line 36 into the input end 34 of duct 32. The air is now discharged at end 38. The rotary seal 30 insures that the somewhat warmed-up ambient air passing through line 36 does not mix with the air at ambient (and hence lower) temperature entering the compressor chamber 28.

It will be noted that the radius of fan rotor 16 may be varied between nearly any desired limits for the purpose of realizing optimum lineal speed of the blades to in turn realize maximum efficiency. It will also be observed that the rotary seal 30 precludes mixing of air passing through duct 32 with the air coming into chamber 28 for compression. it will also be noted that the directional flow of air in duct 32 may be varied at will, it being only necessary to change the pitch of fan rotor 16 to the opposite sense. In that case, ambient would enter end 38 of duct 32 and exit from line 36 of intercooler 26.

Figure 3:
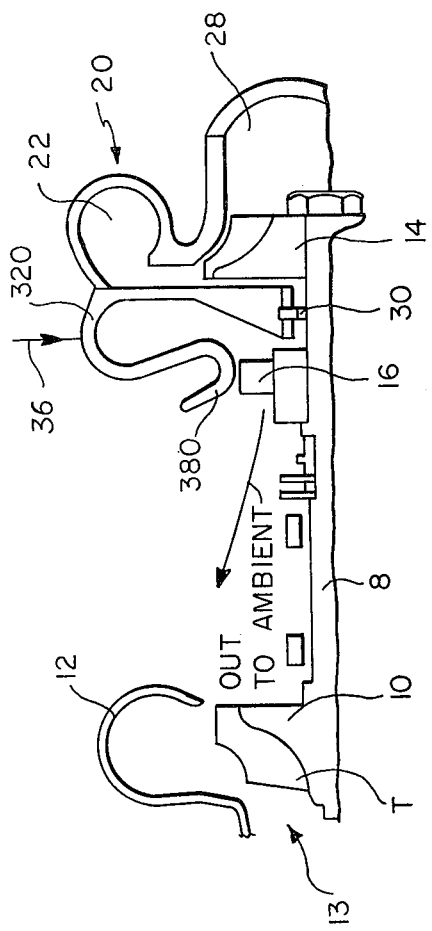
FIG. 3 is a view similar to FIG. 1 and illustrates a second embodiment.

Referring now to FIG. 3 of the drawings, an embodiment is shown wherein the fan 16 is positioned between the turbine wheel 10 and the compressor 20. The input 28 (also defining an input chamber to the compressor) from the air filter is now at the right end of shaft 8, the compressor 20 being otherwise similar to that of the embodiment of FIG. 1. The duct 32 of the first embodiment now assumes the form of an annular chamber surrounding shaft 8 and is given the designation 320 in FIG. 3. The end 38 of the duct adjacent the fan 16 is denoted by 380 at FIG. 3. As before, the input to duct 320 is from line 36 after passing through the intercooler 26.

Figure 2:
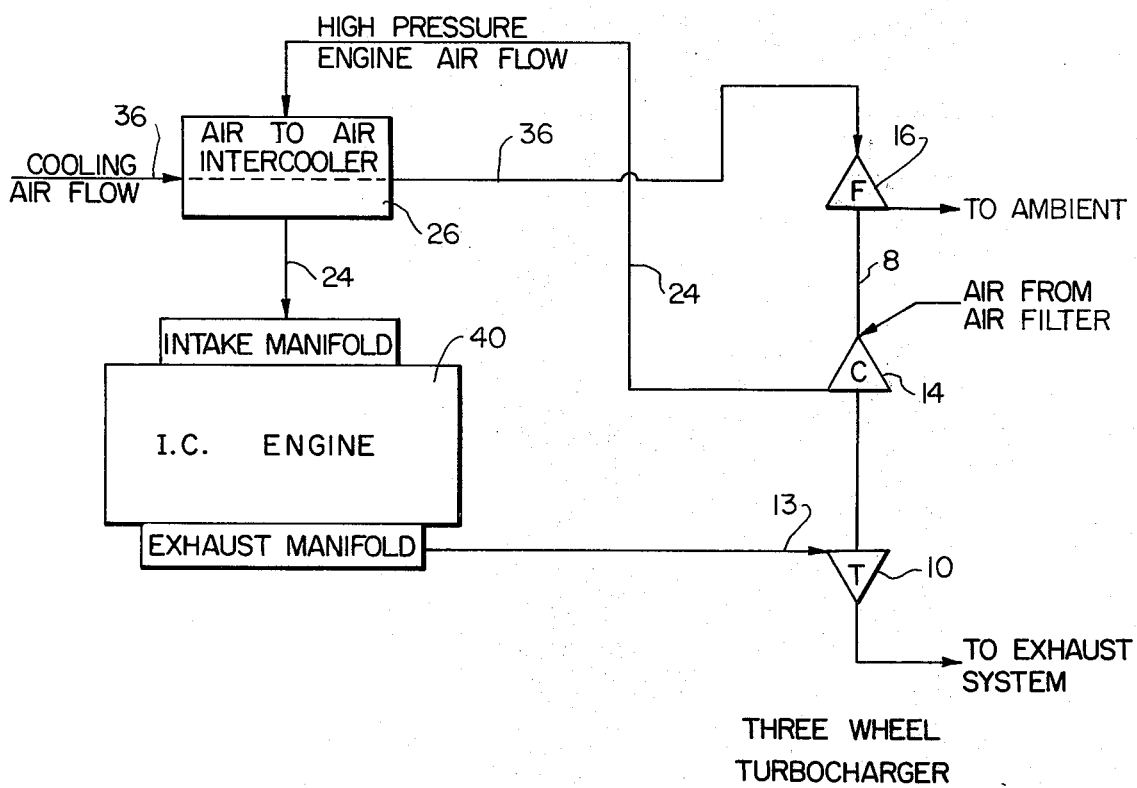
FIG. 2 is a schematic diagram illustrating the entire combination of the turbocharger of this invention, a conventional air-to-air intercooler, and a conventional internal combusion engine.

This embodiment is otherwise structurally similar to that described at FIGS. 1 and 2. It enables one to employ the air in line 36 (passing from ambient, through intercooler 26, thence to the fan 16) as a coolant for the relatively hot turbine housing 12. This function is indicated by the arrow of FIG. 3, denoting the exhaust from fan 16 directed towards the turbine housing. The passing through line 36 thus performs the dual function of cooling the compressed air in the intecooler and cooling the turbine housing. Further, the proximity of the chamber defined by duct 320 permits heat abstraction from compressor chamber 22 with consequent lower operating temperature thereof. This additional cooling feature will obtain even if the pitch of fan 16 is reversed so as not to blow on the turbine housing. Clearly, as in the embodiment of FIG. 1, the air flow through line 36 may be in either direction.

I claim:

1. A turbocharger compressor of the centrifugal type and adapted to be driven by exhaust gases from the exhaust manifold of an internal combustion engine, a turbine rotor and a compressor rotor connected to and axially spaced from each other along a rotor shaft, said turbine rotor adapted to be driven by exhaust gases, compressor input and output chambers contiguous to said compressor rotor, the improvement comprising, a fan rotor coupled to and axially located along said rotor shaft at a point different from the axial locations of said turbine and compressor rotors, a duct surrounding said fan, said duct being open at one end thereof to ambient, a seal surrounding said rotor shaft to preclude mixing between gases passing through the compressor and gases passing through the duct, whereby rotation of said fan rotor causes a pressure differential and consequent air flow in the duct.

2. The turbocharger of claim 1 wherein said compressor rotor is positioned between said turbine and said fan rotors, and wherein said fan rotor is located at one end of said rotor shaft.

3. The turbocharger of claim 1 including:
   a. an internal combustion engine having an intake and an exhaust manifold,
   b. an air-to-air intercooler having a first air flowpath therethrough in heat exchange relation with a second flowpath therethrough,
   c. the input of said first intercooler flowpath opening to ambient,
   d. the output of said first intercooler flowpath coupled to the other end of said fan duct,
   e. the input of said second intercooler flowpath coupled to said output chamber of said compressor rotor,
   f. the output of said second intercooler flowpath coupled to said intake manifold,
   g. the output of said exhaust manifold adapted to rotate said turbine rotor.

4. The turbocharger of claim 1 wherein said fan is positioned between said turbine and compressor rotors.

5. The turbocharger of claim 4 wherein the pitch of said fan is such as to blow air in said duct towards said turbine rotor to thereby cool a housing associated with the turbine rotor.

6. The turbocharger of claim 4 wherein said duct is in the form of an annular chamber.

7. The turbocharger of claim 6 wherein said duct which is in the form of an annular chamber has a wall common to one of the chambers at said compressor.

8. The turbocharger of claim 1 wherein said seal is carried by a portion of said compressor.

* * * * *